(12) United States Patent
McBrayer, Jr. et al.

(10) Patent No.: US 6,171,509 B1
(45) Date of Patent: Jan. 9, 2001

(54) METHOD AND APPARATUS FOR TREATING SALT STREAMS

(75) Inventors: Roy Nelson McBrayer, Jr., Austin, TX (US); Lars Henning Tidlund, Stenungsund; Lars Berhil Stenmark, Karlskoga, both of (SE)

(73) Assignee: Chematur Engineering AB, Karlskoga (SE)

(*) Notice: Under 35 U.S.C. 154(b), the term of this patent shall be extended for 0 days.

(21) Appl. No.: 09/096,873

(22) Filed: Jun. 12, 1998

(51) Int. Cl.$^7$ ........................................................ C02F 1/68
(52) U.S. Cl. ........................................... 210/752; 210/761
(58) Field of Search ................................... 210/752, 758, 210/759, 760, 761

(56) References Cited

U.S. PATENT DOCUMENTS

| | | |
|---|---|---|
| 4,113,446 | 9/1978 | Modell et al. . |
| 4,141,829 | 2/1979 | Thiel et al. . |
| 4,292,953 | 10/1981 | Dickinson . |
| 4,338,199 | 7/1982 | Modell . |
| 4,377,066 | 3/1983 | Dickinson . |
| 4,380,960 | 4/1983 | Dickinson . |
| 4,543,190 | 9/1985 | Modell . |
| 4,564,458 | 1/1986 | Burleson . |
| 4,593,202 | 6/1986 | Dickinson . |
| 4,594,164 | 6/1986 | Titmas . |
| 4,792,408 | 12/1988 | Titmas . |
| 4,822,394 | 4/1989 | Zeigler et al. . |
| 4,822,497 | 4/1989 | Hong et al. . |
| 4,861,497 | 8/1989 | Welch et al. . |
| 4,891,139 | 1/1990 | Zeigler et al. . |
| 4,898,107 | 2/1990 | Dickinson . |
| 4,983,296 | 1/1991 | McMahon et al. . |
| 5,011,614 | 4/1991 | Gresser et al. . |
| 5,053,142 | 10/1991 | Sorensen et al. . |
| 5,057,231 | 10/1991 | Mueller et al. . |
| 5,106,513 | 4/1992 | Hong . |
| 5,133,877 | 7/1992 | Rofer et al. . |
| 5,182,027 | * 1/1993 | Gallup ................................. 210/696 |
| 5,183,577 | 2/1993 | Lehmann . |
| 5,192,453 | 3/1993 | Keckler et al. . |
| 5,221,486 | 6/1993 | Fassbender et al. . |
| 5,232,604 | 8/1993 | Swallow et al. . |
| 5,232,605 | 8/1993 | Baur et al. . |
| 5,240,619 | 8/1993 | Copa et al. . |

(List continued on next page.)

FOREIGN PATENT DOCUMENTS

| | | |
|---|---|---|
| 584671 | * 5/1944 | (GB) . |
| 2 297 321 | 7/1996 | (GB) . |
| 10-137774 | 5/1998 | (JP) . |
| 10-137775 | 5/1998 | (JP) . |
| 96/27558 | 9/1996 | (WO) . |

OTHER PUBLICATIONS

International Search Report, Application No. PCT/SE99/01006, mailed Nov. 9, 1999.
U.S. Patent Application Serial No. 08/657,899.

Primary Examiner—Chester T. Barry
(74) Attorney, Agent, or Firm—Conley, Rose & Tayon, P.C.

(57) ABSTRACT

A method for avoiding the precipitation of salts from a salt containing water stream prior to the stream reaching a supercritical water reactor is presented. The salt containing water stream is preferably kept at temperatures below supercritical conditions as the stream is transferred to the reactor. After the salt stream reaches the reactor the temperature of the salt stream is preferably raised to the appropriate temperature by mixing the salt stream, within the reactor, with a second stream that has been heated above the supercritical temperature of water. Alternatively, a method for preventing the clogging of the conduits upstream from the reactor may involve the mixing of two subcritical waste streams. One stream may include salts, the other preferably includes oxidizable material. The heat produced by the reaction of the oxidizable materials within the reactor preferably allows the mixture to remain at supercritical conditions for a time sufficient to oxidize substantially all of the oxidizable material.

58 Claims, 2 Drawing Sheets

U.S. PATENT DOCUMENTS

| | | |
|---|---|---|
| 5,250,193 | 10/1993 | Sawicki et al. . |
| 5,252,224 | 10/1993 | Modell et al. . |
| 5,405,533 | 4/1995 | Hazlebeck et al. . |
| 5,492,634 * | 2/1996 | Hong et al. .......................... 210/761 |
| 5,551,472 | 9/1996 | McBrayer, Jr. et al. . |
| 5,552,039 | 9/1996 | McBrayer, Jr. et al. . |
| 5,582,715 | 12/1996 | McBrayer, Jr. et al. . |
| 5,591,415 | 1/1997 | Dassel et al. . |
| 5,620,606 | 4/1997 | McBrayer, Jr. et al. . |
| 5,674,405 * | 10/1997 | Bourhis et al. ...................... 210/761 |
| 5,720,889 * | 2/1998 | McBrayer, Jr. et al. ............. 210/739 |
| 5,755,974 | 5/1998 | McBrayer, Jr. et al. . |
| 5,770,174 | 6/1998 | Eller et al. . |
| 5,785,868 * | 7/1998 | Li et al. .............................. 210/761 |
| 6,017,460 * | 1/2000 | Eller ................................... 210/739 |

* cited by examiner

METHOD AND APPARATUS FOR TREATING SALT STREAMS

BACKGROUND OF THE INVENTION

1. Field of the Invention

This invention generally relates to the inhibition of plugging in supercritical water reaction systems. More particularly, the invention relates to the inhibition of plugging in components upstream from a supercritical water reactor.

2. Description of the Related Art

Materials that are reacted in supercritical waste oxidization ("SCWO") systems typically operate at relatively high pressures and high temperatures (e.g., at least about 700° F. and 3200 psia (about 370° C. and 220 bar)). Other systems may operate in the vicinity of supercritical conditions for water (i.e., at least about 500° F. and about 2000 psia (about 260° C. and 138 bar). Inorganic salts tend to have a low solubility within supercritical water. At a constant pressure, the solubility of salts typically increases as the temperature of the water increases. As the temperature approaches within about 10° F. (about 5° C.) of the supercritical temperature of water, the solubility of inorganic salts tends to drop to low values. Concurrently, the solubility of organic compounds, normally relatively insoluble in water, increases. This increase in solubility tends to assist the oxidation of the organic compounds.

Oxidizable matter that is reacted or oxidized in SCWO systems may cause solids or char to form within the reactor due to the low insolubility of the oxidation products within supercritical water. Alternately, the streams themselves (especially hazardous waste streams) may contain salts or solids, which tend to be insoluble at supercritical conditions. The presence of salts or solids in the reaction zone of the reactor tends to cause problems. For instance, if significant amounts of salts or solids are generated, the salts or solids may either partially or fully plug the reactor, thereby reducing reactor efficiency and/or causing expensive reactor shutdowns for maintenance purposes. Given the particularly high temperatures and pressures at which these systems operate, the replacement and/or maintenance of equipment in such systems tends to be expensive. Therefore, plugging in these systems tends to be a particularly difficult problem to address.

The plugging problem may be accentuated if additives are mixed with the stream to be treated. For instance, additives may be mixed with a given stream to raise or lower its pH (e.g., for the purpose of reducing corrosion) or to neutralize corrosive elements in the stream. These additives, or compounds produced from the additives, may in turn cause plugging in the system. By way of example, if a stream has a low pH, a practitioner may wish to add sodium hydroxide (NaOH) to the stream to raise the pH. If the waste stream contains chlorinated compounds oxidation of these compounds will typically produce hydrochloric acid (HCl). To inhibit the corrosion due to HCl, as well as other acidic compounds, NaOH is typically added to neutralize these acidic products. The reaction of NaOH with HCl typically produces the salt sodium chloride (NaCl). The formed salt may cause plugging of the reactor. Thus the additives available to control stream pH, and/or system corrosion, have necessarily been limited by practical considerations related to system plugging.

During at least one treatment procedure water is heated to supercritical conditions before entering the reactor, typically before oxidants are added. For salt containing waste streams, the rise to supercritical conditions may cause precipitation to occur prior to reaching the reactor. Thus plugging of the system may occur within the heater and conduits upstream from the reactor. While a number of reactor designs are known to prevent plugging of the waste stream within the reactor, little has been done to prevent plugging in the heater or conduits leading to the reactor. It is therefore desirable to devise a method and system for preventing the precipitation of salts within the system upstream from the reactor due to the rise to supercritical conditions. Such a method may help prevent the plugging of the system.

Conventional reactor assemblies operating in the vicinity of supercritical conditions for water are described in detail in the following patents or patent applications:

U.S. Pat. No. 5,403,533 to Hazlebeck et al., U.S. Pat. No. 4,141,829 to Thiel et al., U.S. Pat. No. 4,292,953 to Dickinson, U.S. Pat. No. 4,338,199 to Modell, U.S. Pat. No. 4,377,066 to Dickinson, U.S. Pat. No. 4,380,960 to Dickinson, U.S. Pat. No. 4,543,190 to Modell, U.S. Pat. No. 4,564,458 to Burleson, U.S. Pat. No. 4,593,202 to Dickinson, U.S. Pat. No. 4,594,164 to Titmas, U.S. Pat. No. 4,792,408 to Titmas, U.S. Pat. No. 4,822,394 to Zeigler et al., U.S. Pat. No. 4,822,497 to Hong et al., U.S. Pat. No. 4,861,497 to Welch et al., U.S. Pat. No. 4,891,139 to Zeigler et al., U.S. Pat. No. 4,113,446 to Modell et al., U.S. Pat. No. 5,106,513 to Hong, U.S. Pat. No. 4,898,107 to Dickinson, U.S. Pat. No. 4,983,296 to McMahon et al., U.S. Pat. No. 5,011,614 to Gresser et al., U.S. Pat. No. 5,053,142 to Sorensen et al., U.S. Pat. No. 5,057,231 to Mueller et al., U.S. Pat. No. 5,133,877 to Rofer et al., U.S. Pat. No. 5,183,577 to Lehmann, U.S. Pat. No. 5,192,453 to Keckler et al., U.S. Pat. No. 5,221,486 to Fassbender, U.S. Pat. No. 5,232,604 to Swallow et al., U.S. Pat. No. 5,232,605 to Baur et al., U.S. Pat. No. 5,240,619 to Copa et al., U.S. Pat. No. 5,250,193 to Sawicki et al., U.S. Pat. No. 5,252,224 to Modell et al., U.S. Pat. No. 4,822,497 to Hong et al., U.S. Pat. No. 5,551,472 to McBrayer et al., U.S. Pat. No. 5,755,974 to McBrayer et al., U.S. Pat. No. 5,620,606 to McBrayer et al., U.S. Pat. No. 5,582,715 to McBrayer et al., U.S. Pat. No. 5,591,415 to McBrayer et al., U.S. Pat. No. 5,552,039 to McBrayer et al., and U.S. Pat. No. 5,770,174 to Eller et al., U.S. Pat. No. 6,017,460 to McBrayer et al. The above-referenced patents and patent applications are hereby incorporated by reference.

SUMMARY OF THE INVENTION

A method for avoiding the precipitation of salts from a salt containing solution prior to the solution reaching the reactor is presented. A first waste stream, which includes a salt and oxidizable matter, is preferably introduced into a supercritical water oxidation system. The first stream is preferably conducted to a first pump. The first pump preferably brings the first stream to a pressure in the vicinity of supercritical conditions for water (i.e., at least about 2000 psia (about 138 bar)), more preferably to a pressure above about 3200 psia (about 220 bar).

After pressurization, the first stream is preferably conducted through a heat exchanger. The first stream is preferably heated by passage through the heat exchanger to a temperature and pressure such that the salts in the first stream remain substantially soluble in the first stream. The temperature of the first stream is preferably maintained below about 700° F. (about 370° C.). The first stream is preferably maintained at a pressure of at least about 3200 psia (about 220 bar). At temperatures above about 700° F. (about 370° C.), the solubility of the salts in the first stream may become lower. If the concentration of salts in the first stream is greater than the solubility limit of the heated first stream, a portion of the salts may precipitate out of the first stream. These precipitates may cause plugging of the system components. After passing through a heat exchanger the first stream is preferably conducted to a supercritical water reactor.

A second stream is preferably introduced into the system. The second stream is preferably a water stream which is substantially free of salts. The second stream may include water only. Preferably, the second stream is a water stream which includes oxidizable material. The oxidizable material preferably includes organic compounds.

The second stream is preferably passed to a second pump. The second pump preferably brings the second stream to a pressure in the vicinity of supercritical conditions for water. The stream is preferably brought to a pressure above about 3200 psia (about 220 bar).

After pressurizing the second stream, the second stream is preferably conducted through a heat exchanger. The heat exchanger is preferably used to pre-heat the second stream. After passing through the heat exchanger, the second stream is transferred to a heater. The heater preferably heats the second stream to a temperature greater than about 700° F. (about 370° C.). Preferably, the second stream is heated to a temperature such that, when the second stream is mixed with the first stream, the resulting mixture has a temperature that is above about 700° F. (about 370° C.)).

After the second stream is pressurized and heated, the second stream is preferably conducted to a mixer. An oxidant from an oxidant feeder may be added to the second stream as it passes to or through the mixer, or after it passes through the mixer. The oxidant may be any source of oxygen. Liquid oxygen, hydrogen peroxide, air, and/or mixtures thereof are preferred. Preferably, the amount of oxidant added is sufficient to oxidize substantially all of the contaminates within the first and second streams.

After addition of the oxidant, the second stream is preferably transferred to the supercritical water reactor. The second stream is preferably introduced into the reactor inlet and passes through the reactor, and then exits out of the reactor outlet.

In one embodiment, the first stream, which includes a mixture of water, salt and oxidizable materials, is preferably mixed with the second stream prior to entering the reactor. The first stream may be mixed with the second stream before the oxidant is added to the second stream. Alternatively, the first stream may be mixed with the second stream after the oxidant has been added to the second stream, prior to the second stream reaching the reactor. In another embodiment, the first stream may be added to the second stream as the second stream is passed through the reactor. A plurality of injection ports downstream from the reactor inlet may be used to introduce the first stream into the reactor. Preferably, a first portion of the first stream is mixed with the second stream prior to the reactor inlet. A second portion of the first stream may also be injected into the reactor as the second stream passes through the reactor.

The mixture of the first and second stream preferably forms a mixed stream. The temperature of the mixed stream is preferably determined by the temperature of both the first and second streams, as well as the flow rates of the two streams. Preferably, the temperature and flow rate of the second stream are predetermined such that the peak temperature of the mixed stream within the reactor is preferably substantially greater than the supercritical temperature of water (e.g., greater than about 700° F. (about 370° C.)), more preferably greater than about 1000° F. (about 540° C.), more preferably still between about 1000° F. to 1200° F. (about 540° C. to 650° C.).

As the mixed stream passes through the reactor, the oxidizable material is preferably oxidized. Substantially complete oxidation of all of the oxidizable materials may, in some instances, occur if the mixed stream is preferably maintained at a temperature above the supercritical temperature of water (i.e., above about 700° F. (about 370° C.)) as the mixed stream passes through the reactor.

When the first and second streams are mixed together, a mixed stream having a temperature that is at least about 700° F. (about 370° C.) is preferably formed. At temperatures above about 700° F. (about 370° C.), the salts dissolved within the mixed stream may precipitate out of the mixed stream. These salts may become redissolved within the mixed stream as the mixed stream cools to temperatures below the supercritical temperature of water (e.g., during passage of the mixed stream through a heat exchanger).

In another embodiment, the precipitated salts may be removed from the mixed stream by a separator. The separator is preferably configured to substantially separate the salt particles from the mixed stream.

After passing through the reactor, the mixed stream is preferably conducted to the heat exchanger. The heat exchanger preferably allows the mixed stream from the reactor to pass through in such a way that the heat from the mixed stream will preheat the first and/or second streams passing through the heat exchanger. The mixed stream may then be transferred to a cooler. The cooler preferably lowers the temperature and pressure of the mixed stream to subcritical conditions. Gases and condensed water are preferably transferred from the system via the cooler. Cooling of the mixed stream in either the heat exchanger or the cooler may cause any precipitated salts to become redissolved within the mixed stream.

An automatic controller may be used to monitor the system and alter the reaction conditions. The controller may adjust the flow rate of the first and/or second streams such that the oxidizable materials are treated within the reactor for a sufficient time to allow the oxidizable material to be substantially oxidized. The controller may also adjust the flow rates of the first and/or second streams to maintain a specified temperature within the reactor. For example, the controller may adjust the flow rate of the first and/or second streams to control the peak reactor temperature. Additionally, the controller may adjust the amount of oxidant added to the second stream prior to, in or after the mixer.

In another embodiment, a method for preventing the clogging of the conduits upstream from the reactor may involve the mixing of two subcritical streams. A first stream (e.g., a waste stream) which includes a salt and oxidizable matter is preferably introduced into the system. The first stream is preferably conducted to a first pump. The first pump preferably brings the first stream to a pressure above about 3200 psia (about 220 bar).

After pressurization, the first stream is preferably conducted through a heat exchanger. The first stream is preferably heated by passage through a heat exchanger and/or a heater to a temperature such that the salts in the first stream remain substantially soluble in the first stream. The temperature of the first stream is preferably maintained below about 700° F. (about 370° C.). The first stream is preferably maintained at a pressure of at least about 3200 psia (about 220 bar).

A second stream is preferably introduced into the system. Preferably, the second stream is a water stream which includes oxidizable material. The second stream may also include salts. The second stream preferably contains a sufficient amount of oxidizable material such that, when mixed with the first stream, the amount of oxidizable material present in the mixed stream is sufficient to obtain supercritical conditions as a result of reaction of the oxidizable material.

The second stream is preferably passed to a second pump. The second pump preferably brings the second stream to a pressure in the vicinity of supercritical conditions for water. The stream is preferably brought to a pressure above about 3200 psia (about 220 bar).

After pressurizing the second stream, the second stream is preferably conducted through a heat exchanger. The second stream is preferably heated by passage through a heat exchanger and/or a heater to a temperature such that the salts in the second stream remain substantially soluble in the second stream. The temperature of the second stream is preferably maintained below about 700° F. (about 370° C.). The second stream is preferably maintained at a pressure of at least about 3200 psia (about 220 bar).

After the first and second streams are pressurized and heated, either the first stream, the second stream, or both streams are preferably conducted to a mixer, where an oxidant from an oxidant feeder may be added to the stream. Preferably, the amount of oxidant added is sufficient to oxidize substantially all of the contaminates within the first stream and the second stream.

The first stream is preferably introduced into the reactor at the reactor inlet. The first stream preferably passes through the reactor, exiting out of the reactor through the reactor outlet. As the first stream is passed through the reactor, the second stream is preferably injected into the reactor. Preferably, the second stream is injected into the reactor at a position downstream from the reactor inlet.

As the second stream is injected into the reactor, a mixed stream is preferably formed. The mixed stream preferably includes a mixture of the first stream and the second stream. The oxidizable material content of the mixed stream may be dependent on the concentration of oxidizable material in the first and second streams. Preferably, the second stream contains a sufficient amount of oxidizable material such that, when the second stream is combined with the first stream, a mixed stream is formed that includes greater than about 5 to 7% by volume of oxidizable material. Preferably, the mixed stream includes greater than about 6% by volume of oxidizable material.

When the mixed stream is conducted through the reactor, the oxidizable material is preferably reacted to form oxidation products. The reaction of the oxidizable materials within the reactor may cause the temperature of the mixed stream to rise. Preferably, the oxidation of the oxidizable material causes the temperature of the mixed stream to rise above about 700° F. (about 370° C.). Since the mixed stream is preferably at a pressure above about 3200 psia (about 220 bar), the increase in temperature may create supercritical conditions within the reactor.

After the oxidation of the oxidizable materials has begun, the temperature of the mixed stream may rise above about 700° F. (about 370° C.). At temperatures above about 700° F. (about 370° C.), the salts dissolved within the mixed stream may precipitate out of the mixed stream. These salts are preferably conducted out of the reactor along with the mixed stream. The mixed stream and the precipitated salts are preferably conducted from the reactor into a separator. After separation of the salts from the mixed stream, the stream is preferably conducted to a cooler. An automatic controller may be used to monitor the system and alter the reaction conditions.

DETAILED DESCRIPTION OF THE PREFERRED EMBODIMENTS

Figure 1:
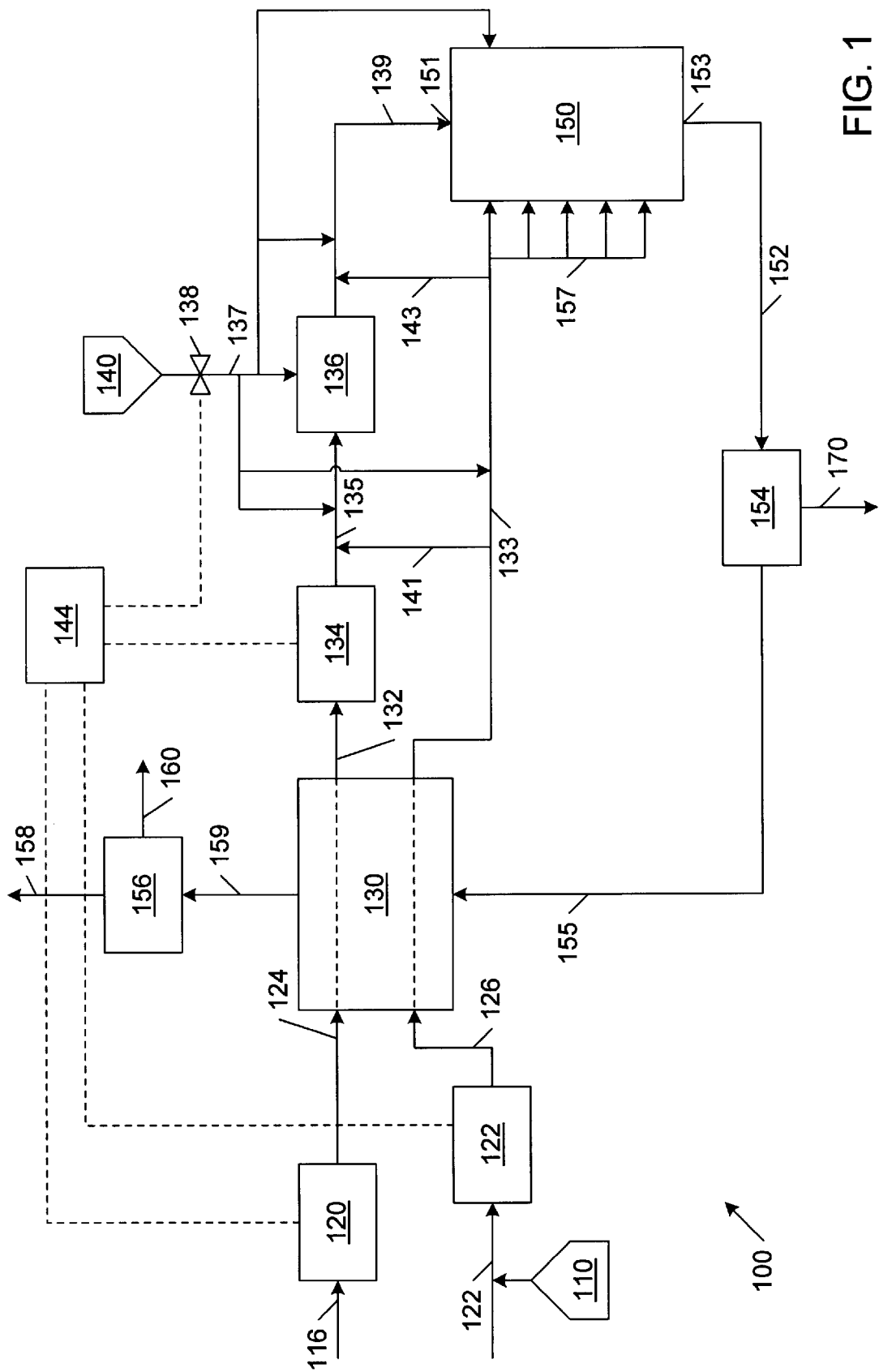
FIG. 1 depicts a block diagram illustrating a reactor assembly for the mixing of a hot waste stream with a cooler waste stream.

The critical point of a solvent is the temperature and pressure above which the solvent cannot be liquefied by increasing the pressure. When heated above its critical temperature, water attains a supercritical state in which the density of water drops to about 0.15 to 0.2 grams/cm$^3$. As used in this patent, the term "supercritical water" is taken to mean water which is in this supercritical state. Supercritical water tends to have significantly different solubility properties than subcritical water. As used in this patent, the term "subcritical water" is taken to mean water at a temperature and pressure below the critical point. Organic substances, which are normally substantially insoluble within subcritical water, tend to become highly soluble within supercritical water. Alternatively, inorganic substances, which are typically soluble within subcritical water, tend to become substantially insoluble within supercritical water.

As used in this patent, the term "supercritical conditions for water" is taken to mean a temperature higher than about 700° F. (about 370° C.) and a pressure higher than about 3200 psia (about 220 bar). As used in this patent, the term "vicinity of supercritical conditions for water" is taken to mean temperatures from about 550° F. to 1200° F. (about 288° C. to 650° C.) and pressures from about 2000 psia to 5000 psia (about 138 bar to 345 bar). As used in this patent, the term "subcritical conditions for water" is taken to mean temperatures below about 700° F. (about 370° C.) and pressures below about 3200 psia (about 220 bar).

The insolubility of inorganic materials within supercritical water tends to present problems for reactors operating on water having a high salt content (e.g., sea water). Under typical processing conditions, the contaminated water is typically heated to supercritical conditions before entering the reactor. Typically, as the salt containing solution approaches within about 10° F. (about 5° C.) of the critical point of water, the solubility of the dissolved salts drops to very low levels. It appears that the salts dissolved within the water tend to precipitate out when the water is heated near to supercritical conditions. This precipitation may cause the formation of salt deposits within the heater and the conduits leading to the reactor. Eventually, the reactor may become clogged and require servicing.

Water containing halogenated organic materials, such as chloroform, methylene chloride, dichloroethylene and others, and/or sulfur containing compounds, can also present similar problems. During the processing of solutions containing halogenated and/or sulfur containing compounds, pH adjusting additives (e.g., NaOH or NaHCO$_3$) may be added to the solutions to neutralize the acidic products produced within the reactor. These additives are typically added before the solution is introduced into the reactor. The preheating of the water which includes halogenated solvents and/or sulfur containing compounds and additives may cause precipitation of the additives. This precipitation may cause clogging within the heater and the conduits leading to the reactor.

An embodiment of a method for avoiding the precipitation of salts from a salt containing stream prior to the stream reaching a reactor involves keeping the salt containing water stream at temperatures below supercritical conditions as the salt stream is transferred to the reactor. After the salt stream reaches the reactor, the temperature of the salt stream is preferably raised to the appropriate temperature by mixing the salt stream, within the reactor, with a second stream that has been heated above the supercritical temperature of water. The temperature of the second stream is preferably high enough such that the mixing of the second stream with the salt stream produces a mixture having a temperature above the supercritical temperature of water (i.e., above about 700° F. (about 370° C.)). Within the reactor, the inorganic salts may precipitate out; however, this is a well known problem that is readily controlled through the use of various reactor designs known in the art.

Referring to the system 100, depicted in FIG. 1, an embodiment of a method for the destruction of contaminants in salt streams is described in more detail. A first stream (e.g., a waste stream, a process stream, a sea water stream, etc.) which includes a salt and oxidizable matter is preferably introduced into the system via conduit 112. Examples of oxidizable matter may include various organic compounds dissolved or suspended in the water, as well as inorganic compounds. An example of a salt stream is sea water contaminated with organic compounds.

In another embodiment, supply source 110 may contain an inorganic salt for neutralizing oxidation products. During the reaction of halogenated or sulfur containing organic compounds within a supercritical water reactor, the organic compounds are oxidized to produce acidic products. These acidic products tend to corrode the components of the system if not neutralized. Typically, a basic salt (e.g., NaOH or $NaHCO_3$) may be added to the contaminated stream, preferably prior to the reaction of the organic compounds, to neutralize the acidic oxidation products formed. A first stream which includes oxidizable material may be introduced into the system via conduit 112. As the first stream is introduced into the system, a neutralizing salt from salt supply source 110 may be added to form a salt containing first waste stream.

The first stream, made of a mixture of oxidizable material and salt, is preferably conducted through conduit 112 to first pump 122. First pump 122 preferably brings the first stream to a pressure in the vicinity of supercritical conditions for water. A positive displacement pump is preferably used to pressurize the first stream. A positive displacement pump is commercially available from Feluwa, Germany. The first stream is brought to a pressure preferably in the range of about 2000 psia to 5000 psia (about 138 bar to 345 bar); more preferably, above about 3200 psia (about 220 bar).

After pressurizing the first stream with pump 122, the first stream is conducted through heat exchanger 130. Heat exchanger 130 is preferably used to heat the first stream. After the operation of reactor 150 has started, hot effluent coming out of the reactor may be passed through heat exchanger 130 via conduit 155. The first stream is preferably heated by passage through the heat exchanger to a temperature such that the salts in the first stream remain substantially soluble in the first stream. The temperature of the first stream is preferably maintained below about 700° F. (about 370° C.). The first stream is preferably maintained at a pressure of at least about 3200 psia (about 220 bar). At temperatures above about 700° F. (about 370° C.), the solubility of the salts in the first stream may become lower. If the concentration of salts in the first stream is greater than the solubility limit of the heated first stream, a portion of the salts may precipitate out of the first stream. These precipitates may cause plugging of the system components, especially the conduits. An advantage of the described method is that the salt containing first stream is preferably maintained below a temperature that would cause precipitation of the salts (i.e., about 700° F. (about 370° C.)) before the first stream reaches the reactor.

After passing through heat exchanger 130, the first stream is preferably conducted to reactor 150. Optionally, the first stream may be conducted to a heater (not shown). The heater may be used to heat the first stream to temperatures below about 700° F. (about 370° C.). A heater may be used to raise the temperature of the first stream when the heat exchanger 130 fails to heat the first stream to the appropriate temperature level.

A second stream is preferably introduced into the system via conduit 116. The second stream is preferably a water stream which is substantially free of salts. The second stream may include water only. Preferably, the second stream is a water stream which includes oxidizable material. The oxidizable material preferably includes organic compounds. Alternatively, the second stream may contain salts. When the second stream contains salts the concentration or chemical composition of the salts is preferably selected such that the salts substantially remain in solution when the second stream is brought to supercritical conditions.

The second stream is preferably passed via conduit 116 to second pump 120. Second pump 120 preferably brings the second stream to a pressure in the vicinity of supercritical conditions for water. A positive displacement pump is preferably used to pressurize the second stream. The stream is brought to a pressure preferably in the range of about 2000 psia to 5000 psia (about 138 bar to 345 bar), more preferably, above about 3200 psia (about 220 bar).

After pressurizing the second stream with pump 120, the second stream is preferably conducted through heat exchanger 130. Heat exchanger 130 is preferably used to heat the second stream. After the operation of reactor 150 has started, hot effluent coming out of the reactor may be passed through heat exchanger 130 via conduit 155. The passage of the hot effluent over the conduit 124 preferably increases the temperature of the second stream to the vicinity of supercritical conditions.

After passing through heat exchanger 130, the second stream is transferred to heater 134. Heater 134 may be used to heat the second stream to temperatures in the vicinity of supercritical conditions. Heater 134 is preferably a gas heater. Heater 134 preferably heats the second stream to a temperature between about 550° F. to about 1200° F. (about 290° C. to 650° C.), more preferably, in the range of about 700° F. to about 1000° F. (about 370° C. to 540° C.). Preferably, the second stream is heated to a temperature such that, when the second stream is mixed with the first stream, the resulting mixture may achieve a peak reactor temperature above about 700° F. (about 370° C.), preferably above about 1000° F. (about 540° C.), and more preferably between about 1000° F. to 1200° F. (about 540° C. to 650° C.). The peak reactor temperature is the temperature of the stream as it is reacted with a supercritical reactor at supercritical conditions. An advantage of the described method is that little or no precipitation occurs when the second stream is heated above 700° F. (about 370° C.) since the second stream is substantially free of salts.

An oxidant supply system includes an oxidant feeder 140, oxidant feeder conduit 137, and oxidant feeder valve 138. The oxidant supply system may be coupled to deliver oxidant to the first stream upstream from the reactor, the second stream upstream from the reactor, and/or to the reactor. Oxidant feeder valve 138 may be used to control the amount of oxidant added to the system components.

In an embodiment, the oxidant supply system is preferably coupled to mixer 136. The second stream is preferably conducted through conduit 135 to mixer 136, where it may be mixed with oxidant from the oxidant supply system. The oxidant supply system may also be configured to add oxidant to the second stream upstream and/or downstream from the mixer.

The oxidant may be any conventional source of oxygen. Examples of oxygen sources include, but are not limited to, liquid oxygen, air, hydrogen peroxide, ozone, persulfates, permanganates, nitrates and their corresponding acids, oxyacids of chlorine and their corresponding salts, hypochlorites, chlorus acid and chlorites, chlorates, perchlorates and their corresponding acids. Mixtures of oxidants may be used in substantial or even catalytic quantities. Liquid oxygen, hydrogen peroxide, and/or mixtures thereof are preferred. Preferably, the amount of oxidant added is sufficient to oxidize a substantial amount or substantially all of the contaminates within the first stream and the second stream.

The second stream is preferably transferred to reactor 150 through conduit 139. Reactor 150 is preferably configured to allow passage of salts which may precipitate from a stream passing through the reactor at supercritical conditions. The second stream is preferably introduced into reactor 150 at inlet 151 of the reactor. The second stream is preferably passed through reactor 150, exiting out of reactor outlet 153.

In one embodiment, the first stream, which includes a mixture of water, salt and oxidizable materials, is preferably mixed with the second stream prior to entering reactor 150. The first stream may be mixed with the second stream before the oxidant is added to the second stream. The first stream may be conducted via conduit 141 to conduit 135 where the first stream is mixed with the second stream.

In another embodiment, the first stream may be mixed with the second stream after the oxidant has been added to the second stream, prior to the second stream reaching the reactor. The first stream may be conducted via conduit 143 to conduit 139 where the first stream is mixed with the second stream.

In another embodiment, the first stream may be added to the second stream as the second stream is passed through reactor 150. The first stream may be injected into reactor 150 at a position downstream from inlet 151 of the reactor. At least one injection port 157 downstream from reactor inlet 151 is preferably used to allow the introduction of the first stream into reactor 150. A plurality of injection ports 157 downstream from reactor inlet 151 may be used to introduce the first stream into reactor 150.

Preferably, a first portion of the first stream is mixed with the second stream prior to reactor inlet 151. The first portion of the first stream is preferably conducted via conduit 141 and/or 143 to conduits 135 and 139, respectively, such that the first portion of the first stream is mixed with the second stream. A second portion of the first stream may also be injected into reactor 150 as the second stream passes through the reactor. At least one injection point, preferably a plurality of injection points 157, may be used to introduce the second portion of the first stream into the reactor.

Mixing of the first and second streams preferably forms a mixed stream. The temperature of the mixed stream is preferably determined by the temperature of both the first stream and the second stream, as well as the flow rates of the two streams. Preferably, these temperatures and flow rates are predetermined such that the temperature of the mixed stream is substantially greater than the supercritical temperature of water (e.g., greater than about 700° F. (about 370° C.).

As the mixed stream passes through reactor 150, the oxidizable material is preferably oxidized. For substantially complete oxidation of all of the oxidizable materials, the mixed stream preferably achieves a peak reactor temperature above the supercritical temperature of water (e.g., above about 700° F. (about 370° C.)) as the mixed stream passes through reactor 150. Preferably, the initial temperature of the mixed stream is predetermined such that the peak reactor temperature is between about 1000° F. to 1200° F. (about 540° C. to 650° C.). As the mixed stream passes through reactor 150, cooling of the mixed stream to below 700° F. (about 370° C.) may occur due to heat loss from reactor 150 to the surroundings. This heat loss may be offset by heat produced during the oxidation of the oxidizable materials. The supercritical water oxidation of oxidizable materials, especially organic compounds, is typically an exothermic reaction (i.e., a chemical reaction that produces heat). This production of heat during the oxidation of organic compounds may cause the temperature of the surroundings (i.e., the reactor) to rise. Preferably the heat produced by the reaction of the oxidizable material will maintain the mixed stream at a temperature between about 1000° F. to 1200° F. (about 540° C. to 650° C.). When a sufficient amount of oxidizable material is present, this heating of the reactor may be sufficient to prevent cooling of the mixed stream.

If the amount of oxidizable material is relatively low, the heat generated by the oxidation of the oxidizable material may be insufficient to maintain the mixed stream at temperatures above about 700° F. (about 370° C.). In such cases, the mixed stream is preferably formed such that the mixed stream has an initial temperature which is significantly higher than 700° F. (about 370° C.). The initial temperature of the mixed stream is the temperature of the mixed stream when the mixed stream is formed. As the mixed stream passes through reactor 150, the mixed stream may cool due to loss of heat from reactor 150 to the surroundings. Because the reaction of the oxidizable material may be insufficient to maintain the initial temperature, the temperature of the mixed stream typically drops as it passes through reactor 150. To ensure that the final temperature (i.e., the temperature of the mixed stream as it exits reactor 150) is maintained above 700° F. (about 370° C.) the mixed stream is preferably formed such that the initial temperature of the mixed stream is significantly greater than about 700° F. (about 370° C.). This higher initial temperature of the mixed stream preferably inhibits the final temperature of the mixed stream from dropping below about 700° F. (about 370° C.).

For example, mixed streams that contain relatively high concentrations of oxidizable materials may only require an initial temperature that is slightly above about 700° F. (about 370° F.) to achieve an adequate peak reactor temperature. As the mixed stream passes through reactor 150, the oxidizable material may be oxidized causing the temperature of the mixed stream to increase. This temperature increase may be offset, to some extent, by the loss of heat from reactor 150 to the surroundings. When the concentration of oxidizable material is relatively high (e.g., at least greater than about 5% by volume of oxidizable material), the oxidation of this material will preferably maintain the mixed stream at temperatures substantially above about 700° F. (about 370° C.). Preferably, the initial temperature of the mixed stream is at or above about 750° F. (about 400° C.) when the concentration of oxidizable materials is less than about 5% by volume.

If the concentration of oxidizable material is relatively low, the oxidation of the oxidizable material may be insufficient to maintain the mixed stream at a temperature above about 700° F. (about 370° C.). As the mixed stream passes through reactor 150 the temperature of the mixed stream may become lower due to the loss of heat from reactor 150 to the surroundings. When the concentration of oxidizable material is relatively low the oxidation of this material may be insufficient to maintain the mixed stream at temperatures substantially above about 700° F. (about 370° C.). Preferably, the initial temperature of the mixed stream is at or above about 950° F. (about 510° C.) when the concentration of oxidizable materials is at about 1% by volume.

Table 1 further illustrates this concept, based on a series of computer simulations of the mixing of a hot stream with a colder salt containing stream in a supercritical reactor. The simulations were based on the introduction of a salt containing stream which is at a temperature of about 680° F. (about 360° C.) to a hot stream which is at a temperature of 1000° F. (about 540° C.). The salt containing stream was introduced into the reactor at a flow rate of about 100 lb./hr. The concentration of oxidizable material within the mixed stream was varied from 1% to 6% by volume. The temperature of the mixed stream represents the theoretical temperature of the mixed stream which is required to produce a 1000° F. peak temperature in the reactor after oxidation. The heater power refers to the amount of heat required to produce a 1000° F. (about 540° C.) hot stream having the hot stream flow rate given. All streams are maintained at a pressure of about 3200 psia (about 220 bar).

TABLE 1

| Simulation Number | Concentration of Oxidizable Material (% by volume) | Hot Stream Flow Rate (lb./hr) | Temperature of Mixed Stream (° F.) | Heater Power (b.t.u./hr) |
|---|---|---|---|---|
| 1. | 1% | 358 | 976 | 253,000 |
| 2. | 2% | 296 | 948 | 209,000 |
| 3. | 3% | 234 | 910 | 165,000 |
| 4. | 4% | 171 | 861 | 120,000 |
| 5. | 5% | 109 | 800 | 75,300 |
| 6. | 6% | 47 | 743 | 30,700 |

Referring to the simulations, simulation 1 shows that an initial mixed stream temperature of about 976° F. (about 524° C.) would be required to substantially oxidize the oxidizable material at a peak reactor temperature of about 1000° F. (about 540° C.) when the oxidizable material is present at a concentration of 1% by volume. To produce a mixture having a temperature of about 976° F. (about 524° C.), it was determined that a hot stream at about 1000° F. (about 540° C.) would need to be added at a rate of about 358 lb./hr to a salt stream at about 680° F. (about 360° C.) flowing at a rate of about 100 lb./hr. The amount of heat required to produce a hot stream having a temperature of about 1000° F. (about 540° C.) and a flow rate of about 358 lb./hr was determined to be about 253,000 b.t.u./hr.

As the concentration of oxidizable material is increased, the temperature of the mixed stream may be decreased while still allowing complete oxidation of the oxidizable materials at a peak reactor temperature of about 1000° F. (about 540° C.). To lower the temperature of the mixed stream, the flow rate of the hot stream may be reduced while holding the flow rate and temperature of the salt containing stream constant. Thus, when the concentration of oxidizable material is at about 6% by volume the temperature of the mixed stream needs to be at about 743° F. (about 395° C.) or higher (see simulation 6). To produce a mixed stream having a temperature of about 743° F. (about 395° C.), it is was determined that the flow rate of a 1000° F. (about 540° C.) hot stream should be about 47 lb./hr.

When the concentration of oxidizable material is greater than about 6% by volume, the salt containing stream may have an initial temperature that is below about 700° F. (about 370° C.) when introduced into the reactor. Oxidation of the oxidizable material will preferably increase the temperature of the waste stream such that supercritical conditions are achieved within the reactor. A salt containing stream having a concentration of oxidizable material greater than about 6% may be introduced into the reactor at about 680° F. (about 360° C.). The heat produced by the oxidation of the oxidizable materials may be sufficient to raise the temperature of the salt containing stream above about 700° F. (about 370° C.) and maintain the temperature of the salt stream at this level until the oxidizable material is substantially all reacted. For this situation a second stream, having a higher temperature than the salt containing stream, may not be required.

The initial temperature of the mixed stream, formed by mixing the salt containing stream with the a second stream having a higher temperature than the salt containing stream, may be controlled by varying the flow rates of the first and second streams and/or the temperature of the second stream. For example, to raise the initial temperature of the mixed stream, either the flow rate of the first stream may be lowered or the flow rate of the second stream may be increased. To lower the initial temperature of the mixed stream, either the flow rate of the first stream may be increased or the flow rate of the second stream may be decreased.

Additionally, the initial temperature of the mixed stream may be altered by varying the temperature of the second stream. Preferably, the temperature of the first stream is maintained as high as possible without causing the precipitation of salts from the first stream. To adjust the initial temperature of the mixed stream, the temperature of the second stream may be altered. To increase the initial temperature of the mixed stream, the temperature of the second stream may be increased while the flow rate of the first and second streams remains constant. To decrease the initial temperature of the mixed stream, the temperature of the second stream may be decreased while the flow rate of the first and second stream is held constant.

When the first and second streams are mixed together, a mixed stream having a temperature that is at least about 700° F. (about 370° C.) is preferably formed. At temperatures above about 700° F. (about 370° C.) the salts dissolved within the mixed stream may precipitate out of the mixed stream. Reactor 150 is preferably configured to allow the precipitated salts to flow through the reactor without substantially inhibiting the flow of the mixed stream. Reactors configured to allow the flow of solids along with supercritical fluids typically include reaction zones which may have a relatively large diameter. One such reactor is described in "SCWRO Process for Regeneration of Activated Carbon and Destruction of Pollutants in Supercritical Water" by M. J. Cocero et al.

The precipitated salts are preferably conducted out of reactor 150 along with the mixed stream. After passing through separator 154 the mixed stream is preferably conducted to heat exchanger 130 through conduit 155. Heat exchanger 130 preferably allows the mixed stream from reactor 150 to pass through in such a way that the heat from the mixed stream will preheat the first and second streams passing through conduits 124 and 126. Cooling of the mixed stream in the heat exchanger may cause the temperature of the mixed stream to drop below about 700° F. (370° C.). If the mixed stream drops below 700° F. (370° C.) any precipitated salts may become redissolved within the mixed stream. Thus, plugging of the reactor may be avoided by lowering the temperature of the mixed stream after passage through reactor 150.

In another embodiment, the precipitated salts may be removed from the mixed stream by a separator. The separator is preferably configured to substantially separate the salt particles from the mixed stream. Conduit 152 preferably conducts the mixed stream and the precipitated salt from reactor 150 into a separator 154. Separator 154 may be a hydrocyclone separator or a gravity separator. Alternatively, the separator may be incorporated into the reactor. Separator 154 is preferably configured to substantially separate the salt particles from the mixed stream. The separated salt particles are preferably conducted out of the system via conduit 170.

The mixed stream is preferably transferred to cooler 156 via conduit 159. Cooler 156 preferably lowers the temperature and pressure of the mixed stream to subcritical conditions. Gases are preferably released to the atmosphere through conduit 158. Condensed water is preferably transferred from the system 100 through conduit 160.

A controller 144 may be used to monitor system 100 and alter the reaction conditions. Controller 144 may be a computer, programmable logic controller, or any of other known controller systems known in the art. These systems may include a proportional-integral ("PI") controller or a proportional-integral-derivative ("PID") controller. Controller 144 may be part of an electronic, digital, or pneumatic system. Controller 144 may also send, and optionally receive, signals to and/or from the system components that may be electronic, digital, or pneumatic.

Controller 144 may adjust the flow rate of the first and second streams through reactor 150. The flow rate of the streams may be adjusted by altering the pump displacement or speed of the first and second pumps. Controller 144 may send signals to the pumps to control the flow rate of the streams. The flow rate is preferably adjusted such that the oxidizable materials are treated within reactor 150 for a sufficient time to allow the oxidizable material to be substantially oxidized. The controller may also adjust the flow rates of the first and second streams to maintain a specified temperature within the reactor. Controller 144 may also adjust the temperature of the second stream. Controller 144 may send signals to heater 134 in response to changes in temperature from reactor 150. Additionally, controller 144 may adjust the amount of oxidant added to the second stream in mixer 136 by controlling the oxidant feeder valve 138. The amount of oxidant added is preferably controlled in response to changes in temperature and/or pressure of reactor 150. Additionally, the controller may vary the amount of oxidant as a function of the concentration of oxidizable material contained in the streams.

In another embodiment, a method for preventing the clogging of the conduits upstream from the reactor may involve the mixing of two subcritical streams. As in the previous method, a salt stream is preferably maintained at temperatures below supercritical conditions as the solution is transferred to a reactor. A second stream is also added to the reactor to form a mixture of the two streams. The second stream preferably includes a relatively high amount of oxidizable material. The mixed stream formed by mixing the first stream with the second stream preferably includes a sufficient amount of oxidizable material to cause an exothermic reaction within the reactor. The heat produced by the reaction is preferably sufficient to raise the temperature of the mixed stream above about 700° F. (about 370° C.). The heat produced by the reaction of the oxidizable materials within the reactor preferably allows the mixture to remain at a temperature above about 700° F. (about 370° C.) for a time sufficient to oxidize a substantial amount or substantially all of the oxidizable material. Typically, the concentration of oxidizable material within the mixed stream is above about 6%. In this manner clogging may be prevented upstream from the reactor.

Figure 2:
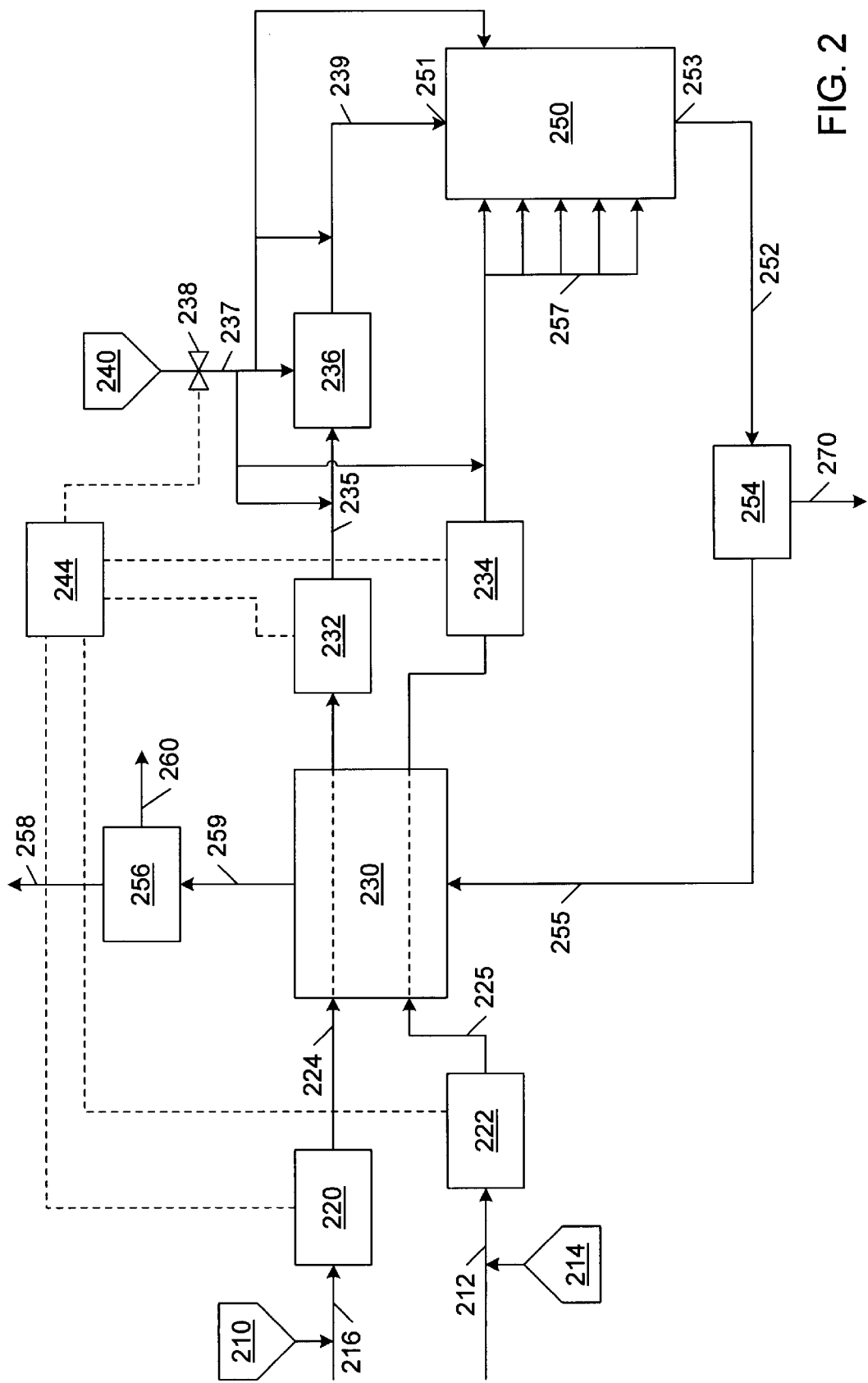
FIG. 2 depicts a block diagram illustrating a reactor assembly for the mixing of a waste stream containing oxidizable material with a salt containing waste stream.

Referring to the system 200 depicted in FIG. 2, an embodiment of a method for the destruction of contaminants in salt streams is described in more detail. A first stream, which includes a salt and oxidizable matter, is preferably introduced into the system via conduit 216. Examples of oxidizable matter may include various organic compounds dissolved or suspended in the water, as well as some inorganic compounds. An example of a salt stream is sea water which includes organic compounds.

In another embodiment, supply source 210 may contain a pH adjusting additive for neutralizing oxidation products. Typically, a pH adjusting additive (e.g., NaOH or $NaHCO_3$) may be added to the first stream to neutralize the oxidation products formed. A first stream which includes oxidizable material may be introduced into the system via conduit 216. As the first stream is introduced into the system, a pH adjusting additive from supply source 210 may be added to form a first stream which includes a salt.

The first stream made of a mixture of oxidizable material and a salt is preferably conducted through conduit 216 to first pump 220. First pump 220 preferably brings the first stream to a pressure in the vicinity of supercritical conditions for water. A positive displacement pump is preferably used to pressurize the first stream. The first stream is brought to a pressure preferably in the range of about 2000 psia to 5000 psia (about 138 bar to 345 bar), more preferably, above about 3200 psia (about 220 bar).

After pressurizing the first stream with pump 220, the first stream is preferably conducted through heat exchanger 230. Heat exchanger 230 is preferably used to heat the first stream. After the operation of reactor 250 has started, hot effluent coming out of the reactor may be passed through heat exchanger 230 via conduit 255. The first stream is preferably heated by passage through the heat exchanger to a temperature such that the salts in the first stream remain substantially soluble in the first stream. The temperature of the first stream is preferably maintained below about 700° F. (about 370° C.). At temperatures above about 700° F. (about 370° C.), the solubility of the salts in the first stream may become lower. An advantage of the described method is that the stream is not heated above a temperature (i.e., above about 700° F. (about 368° C.)) that would cause substantial precipitation of the salts before the first stream reaches the reactor.

The first stream may be conducted to heater 232. Heater 232 may be used to heat the first stream to temperatures up to about 700° F. (about 368° C.). Heater 232 may be used before the operation of the reactor 250 has begun to heat the first stream. Heater 232 may also be used to raise the temperature of the first stream when heat exchanger 230 fails to heat the waste stream to the appropriate temperature level.

A second stream is preferably introduced into the system via conduit 212. Preferably, the second stream is a stream which includes oxidizable material. The second stream may also include salts. The oxidizable material preferably includes organic compounds. The second stream preferably contains a sufficient amount of oxidizable material such that, when mixed with the first stream, the amount of oxidizable material present in the mixed stream is sufficient to sustain supercritical conditions during the reaction of the oxidizable material.

In another embodiment, supply source 214 may contain oxidizable material. The oxidizable material preferably is an organic compound or group of compounds which may be added to the second stream to increase the concentration of oxidizable materials within the stream. A second stream, which may include oxidizable material, may be introduced into the system via conduit 216. As the second stream is introduced into the system, additional oxidizable material from supply source 214 may be added to form a second stream containing sufficient oxidizable material to sustain supercritical conditions during the reaction of the oxidizable material.

The second stream is passed via conduit 212 to second pump 222. Second pump 222 preferably brings the waste stream to a pressure in the vicinity of supercritical conditions for water. The second stream is brought to a pressure preferably in the range of about 2000 psia to 5000 psia (about 138 bar to 345 bar); more preferably, above about 3200 psia (about 220 bar).

After pressurizing the second stream with pump 222, the second stream is conducted through heat exchanger 230. Heat exchanger 230 is preferably used to heat the second stream. After the operation of the reactor 250 has started, hot effluent coming out of the reactor may be passed through the heat exchanger 230 via conduit 255. The hot effluent preferably is used to heat the second stream as it passes through conduit 225.

After passing through heat exchanger 230, the second stream may be conducted to a heater 234. The second stream is preferably heated by passage through heater 234 to a temperature such that the salts in the second stream remain substantially soluble in the second stream. The heater may be used to heat the stream to temperatures up to about 700° F. (about 370° C.). Heater 234 may be used before the operation of the reactor 250 has begun to heat the second stream. Heater 234 may also be used to raise the temperature of the second stream when heat exchanger 230 fails to heat the second stream to the appropriate temperature level.

After the first stream is pressurized and heated, the stream is preferably conducted through conduit 235 to mixer 236, where it may be mixed with oxidant from oxidant feeder 240 through oxidant feeder line 237. Alternatively, the oxidant may be fed into the first stream upstream from or downstream from mixer 136. In another embodiment, the second stream may be passed through mixer 236 to allow an oxidant to be added, rather than the first stream. In another embodiment, both the first and second streams may pass through mixer 236 where an oxidant may be added to the streams. An oxidant feeder valve 238 may be used to control the amount of oxidant added to the passing stream. The oxidant may be any conventional source of oxygen. Liquid oxygen, hydrogen peroxide, and/or mixtures thereof are preferred. Preferably, the amount of oxidant added is sufficient to oxidize a substantial portion of or substantially all of the oxidizable materials within the first and second streams.

The first stream is preferably transferred to reactor 250 through conduit 239. Reactor 250 is preferably configured to maintain reactor conditions in the vicinity of supercritical conditions for water. More preferably, reactor 250 is configured to maintain reactor conditions at supercritical conditions for water. The first stream is preferably introduced into reactor 250 at inlet 251 of the reactor. The first stream preferably passes through the reactor, exiting out of through reactor outlet 253.

As the first stream is passed through reactor 250, the second stream, which includes a mixture of water and oxidizable materials, is preferably injected into the reactor. Preferably, the second stream is injected into the reactor at a position downstream from inlet 251 of reactor 250. At least one injection port downstream from reactor inlet 251 is preferably used. A plurality of injection points downstream from the reactor inlet may be used to introduce the second stream into reactor 250.

As the second stream is injected into reactor 250, a mixed stream is preferably formed. The mixed stream preferably includes a mixture of the first stream and the second stream. The oxidizable material content of the mixed stream may be dependent on the concentration of oxidizable material in the first and second streams. Preferably, the second stream contains a sufficient amount of oxidizable material such that when the second stream is combined with the first stream a mixed stream is formed that includes greater than about 6% by volume of oxidizable material.

When the mixed stream is conducted through reactor 250, the oxidizable material is preferably reacted to form oxidation products. The oxidation of the oxidizable material may produce exothermic reactions. The exothermic reactions of the oxidizable materials may cause the temperature of the mixed stream to rise. Preferably, the oxidation of the oxidizable material causes the temperature of the mixed stream to rise above about 700° F. (about 370° C.). Since the mixed stream is preferably at a pressure above about 3200 psia (about 220 bar), the increase in temperature may create supercritical conditions within the reactor. By insuring a concentration of oxidizable material above about 6% by volume, the heat of the oxidation reactions should be sufficient to maintain supercritical conditions while the mixture is passed through reactor 250.

An advantage of this method is that plugging of the components upstream from reactor 250 may be reduced. Plugging of the conduits and other components typically occurs when a waste stream is heated to supercritical temperature before reaching the reactor. The heating of a waste stream to these temperatures may cause the dissolved salts to precipitate out of the waste stream. Since neither the first nor the second streams need to be heated to supercritical temperatures (i.e., greater than about 700° F. (about 370 ° C.) before reaching reactor 250, the precipitation of salts from the waste stream may be avoided.

After the oxidation of the oxidizable materials has begun, the temperature of the mixed stream may rise above about 700° F. (about 370° C.). At temperatures above about 700° F. (about 370° C.), the salts dissolved within the mixed stream may precipitate out of the mixed stream. These salts are preferably conducted out of reactor 250 along with the mixed stream. Conduit 252 preferably conducts the mixed stream and the precipitated salt from reactor 250 into a separator 254. Separator 254 may be a hydrocyclone separator or a gravity separator. Alternatively, the separator may be incorporated into the reactor. Separator 254 is preferably configured to substantially separate the salt particles from the mixed stream. The separated salt particles are preferably conducted out of the system via conduit 270.

After passing through separator 254, the mixed stream is preferably conducted to heat exchanger 230 through conduit 255. Heat exchanger 230 preferably allows the mixed stream from reactor 250 to pass through in such a way that the heat from the mixed stream will preheat the first and second streams passing through conduits 224 and 225. The mixed stream may then be transferred to cooler 256 via conduit 259. Cooler 256 preferably lowers the temperature and pressure of the mixed stream to subcritical conditions. Gases are preferably released to the atmosphere through conduit 258. Condensed water is preferably transferred from the system 200 through conduit 260.

A controller 244 may be used to monitor system 200 and alter the reaction conditions. Controller 244 may adjust the flow rate of the first and second streams through reactor 250. Controller 244 may send signals to the pumps to control the flow rate of the streams. Controller 244 may also adjust the temperature of the first stream, the second stream or both streams. Controller 244 may send signals to heaters 232 and 234 in response to changes in temperature from reactor 250. Additionally, controller 244 may adjust the amount of oxidant added to the waste stream passing through mixer 236 by controlling the oxidant feeder valve 238. The amount of oxidant added is preferably controlled in response to changes in temperature and pressure of reactor 250 and as a function of the concentration of oxidizable material contained in the streams.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the following claims.

What is claimed is:

1. A method for treating a first stream comprising oxidizable material, a salt and water in a reactor at a temperature of at least about 700° F. (about 370° C.) and a pressure of at least about 3200 psia (about 220 bar), comprising:

mixing the first stream with a second stream upstream from the reactor to form a mixed stream, wherein the second stream is at a pressure of at least about 3200 psia (about 220 bar) and a temperature of at least about 700° F. (about 370° C.), wherein the first stream is at a pressure and temperature such that the salt in the first stream remains substantially dissolved within the first stream, and wherein the mixed stream is at a temperature of at least about 700° F. (about 370° C.) and a pressure of at least about 3200 psia (about 220 bar);

adding an oxidizer to the mixed stream before introducing the mixed stream into the reactor;

introducing the mixed stream into the reactor; and reacting at least a portion of the oxidizable material in the reactor.

2. The method of claim 1, wherein the first stream is at a pressure of at least about 3200 psia (about 220 bar) and a temperature below about 700° F. (about 370° C.).

3. The method of claim 1, further comprising adding a pH adjusting additive to the first stream prior to mixing the first stream with the second stream.

4. The method of claim 1, further comprising heating the first stream to a temperature of between about 650–695° F. (about 343–368° C.) before mixing the first stream with the second stream.

5. The method of claim 1, further comprising heating the second stream to a temperature of between about 1000° F. (about 540° C.) to about 1200° F. (about 650° C.).

6. The method of claim 1, further comprising varying a flow rate of the second stream as a function of a concentration of the oxidizable material in the mixed stream.

7. The method of claim 1, further comprising varying a flow rate of the second stream as a function of a temperature of the mixed stream.

8. The method of claim 1, further comprising varying a flow rate of the second stream to maintain a predetermined temperature of the mixed stream, and wherein the temperature of the mixed stream is maintained at a value which produces a predetermined peak reactor temperature.

9. The method of claim 1, wherein formation of the mixed stream is accompanied by precipitation of a portion of the salt, and further comprising passing the mixed stream through a separator to remove the precipitated salt from the mixed stream.

10. The method of claim 1, further comprising passing a portion of an exit stream from the reactor through a heat exchanger, and wherein the passage of the exit stream through the heat exchanger heats the first and second streams prior to the first and second streams being mixed together.

11. The method of claim 1, further comprising passing the mixed stream into a cooler subsequent to reacting the oxidizable matter, wherein the cooler is configured to bring the mixed stream to subcritical conditions.

12. The method of claim 1, further comprising varying the temperature of the second stream to control the temperature of the mixed stream.

13. The method of claim 1, wherein the second stream further comprises oxidizable material.

14. The method of claim 1, wherein the oxidizable material comprises organic compounds.

15. The method of claim 1, wherein the oxidizable material comprises halogenated solvents, and further comprising adding pH adjusting additives to the first stream prior to introducing the mixed stream into the reactor.

16. The method of claim 1, wherein the oxidizable material comprises sulfur containing compounds, and further comprising adding pH adjusting additives to the first stream prior to introducing the mixed stream into the reactor.

17. The method of claim 1, wherein a concentration of oxidant in the mixed stream is able to oxidize substantially all of the oxidizable material in the mixed stream.

18. A method for treating a first stream comprising oxidizable material, salt and water in a reactor at a temperature of at least about 700° F. (about 370° C.) and a pressure of at least about 3200 psia (about 220 bar), comprising:

mixing the first stream with a second stream to form a mixed stream upstream from the reactor, wherein the second stream is at a pressure of at least about 3200 psia (about 220 bar) and a temperature of between about 1000° F. (about 540° C.) and 1200° F. (about 650° C.), wherein the first stream is at a pressure of at least about 3200 psia (about 220 bar) and a temperature up to about 700° F. (about 370° C.), and wherein the mixed stream is at a temperature of at least about 700° F. (about 370° C.) and a pressure of at least about 3200 psia (about 220 bar);

introducing the mixed stream into the reactor; and reacting at least a portion of the oxidizable material of the mixed stream within the reactor.

19. The method of claim 18, further comprising adding a pH adjusting additive to the first stream prior to mixing the first stream with the second stream.

20. The method of claim 18, further comprising heating the first stream to a temperature of between about 650–695° F. (about 340–370° C.) prior to mixing the first stream with the second stream.

21. The method of claim 18, further comprising adding an oxidant to the second stream prior to mixing the first stream with the second stream.

22. The method of claim 18, further comprising varying a flow rate of the second stream as a function of concentration of the oxidizable material in the mixed stream.

23. The method of claim 18, further comprising varying a flow rate of the second stream to control the temperature of the mixed stream.

24. The method of claim 18, further comprising varying a flow rate of the second stream to substantially maintain the temperature of the mixed stream near a predetermined temperature value before the mixed stream is introduced into the reactor, and wherein the predetermined temperature of the mixed stream is sufficient to generate a substantially constant peak reactor temperature.

25. The method of claim 18, wherein formation of the mixed stream is accompanied by precipitation of a portion of the salt, and further comprising passing the mixed stream through a separator to remove the precipitated salt from the mixed stream.

26. The method of claim 18, further comprising passing the mixed stream from the reactor through a heat exchanger, and wherein the passage of the mixed stream through the heat exchanger heats the first and second streams prior to these streams being mixed.

27. The method of claim 18, further comprising passing the mixed stream into a cooler subsequent to reacting the oxidizable matter, wherein the cooler is configured to bring the mixed stream to subcritical conditions.

28. The method of claim 18, further comprising varying the temperature of the second stream to control the temperature of the mixed stream.

29. The method of claim 18, wherein the second stream further comprises oxidizable material.

30. The method of claim 18, wherein the oxidizable material comprises organic compounds.

31. The method of claim 18, wherein the oxidizable material comprises halogenated solvents, and further comprising adding a pH adjusting additive to the first stream prior to introducing the mixed stream into the reactor.

32. The method of claim 18, wherein the oxidizable material comprises sulfur containing compounds, and further comprising adding a pH adjusting additive to the first stream.

33. The method of claim 18, wherein the mixed stream further comprises an oxidant, and wherein a concentration of oxidant in the mixed stream is sufficient to oxidize the oxidizable material in the mixed stream.

34. A method for treating a mixed stream comprising oxidizable material, a salt and water in a reactor at a temperature of at least about 700° F. (about 370° C.) and a pressure of at least about 3200 psia (about 220 bar), comprising:

adding oxidizer to a first stream and a second stream, wherein an amount of oxidizer added to the first stream and the second stream is sufficient to oxidize substantially all oxidizable material present in the first stream and second stream;

introducing the first stream into the reactor, the first stream comprising oxidizable material, salt and water, wherein the first stream is at a pressure of at least about 3200 psia (about 220 bar) and a temperature less than about 695° F. (about 368° C.);

introducing the second stream into the reactor, the second stream comprising oxidizable material and water, wherein the second stream is at a pressure of at least about 3200 psia (about 220 bar) and a temperature less than about 695° F. (about 368° C.);

mixing the second stream with the first stream to form the mixed stream within the reactor such that the mixed stream is at a pressure of at least about 3200 psia (220 bar) and a temperature less than about 695° F. (about 368° C.); and reacting the oxidizer with at least a portion of the oxidizable material within the reactor, wherein the reaction of the oxidizable material causes a temperature of the mixed stream to rise above about 700° F. (about 370° C.) but less than about 1200° F. (about 650° C.) so that water within the mixed stream is at supercritical conditions for a significant portion of a residence time of the water within the reactor.

35. The method of claim 34, further comprising adding a pH adjusting additive to the first stream prior to introducing the first stream into the reactor.

36. The method of claim 34, further comprising heating the first stream such that the temperature of the first stream is about 650–695° F. (about 343–368° C.).

37. The method of claim 34, further comprising adding an oxidant to the first stream prior to introducing the first stream into the reactor.

38. The method of claim 34, further comprising adding an oxidant to the second stream prior to introducing the first stream into the reactor.

39. The method of claim 34, further comprising heating the second stream such that the temperature of the second stream is about 650–695° F. (about 343–368° C.).

40. The method of claim 34, wherein the first stream is introduced into the reactor at a first position, and wherein the second stream is introduced into the reactor at a second position that is downstream from the first position.

41. The method of claim 34, wherein reaction of the mixed stream is accompanied by precipitation of a portion of the salt, and further comprising passing the mixed stream through a separator to remove the precipitated salt from the mixed stream.

42. The method of claim 34, further comprising passing the mixed stream from the reactor through a heat exchanger, and wherein the passage of the mixed stream through the heat exchanger heats the first stream.

43. The method of claim 34, further comprising passing the mixed stream into a cooler subsequent to reacting the oxidizable matter, wherein the cooler is configured to bring the mixed stream to subcritical conditions.

44. The method of claim 34, further comprising adding additional oxidizable material to the first stream.

45. The method of claim 34, wherein a portion of the oxidizable material introduced into the reactor comprises organic compounds.

46. The method of claim 34, wherein a portion of the oxidizable material introduced into the reactor comprises halogenated compounds, and further comprising adding a pH adjusting additive to at least one of the first and second streams.

47. The method of claim 34, wherein a portion of the oxidizable material introduced into the reactor comprises sulfur and/or phosphate containing compounds, and further comprising adding a pH adjusting additive to at least one of the first and second streams.

48. The method of claim 34, wherein adding oxidizer to a first stream and a second stream comprises adding the oxidizer only to the first stream.

49. A method for treating a waste stream comprising oxidizable material, salt and water in a reactor at a temperature of at least about 700° F. (about 370° C.) and a pressure of at least about 3200 psia (about 220 bar), comprising:

pressurizing the waste stream to a pressure of at least about 3200 psia (about 220 bar);

heating the waste stream to a temperature in the vicinity of supercritical conditions for water such that the salt remains substantially dissolved within the waste stream, and wherein the temperature of the waste stream is less than about 695° F. (about 368° C.);

conducting a heating stream comprising oxidizable material and water to a mixer, wherein the heating stream is at a pressure of at least about 3200 psia (about 220 bar) and a temperature of at least about 700° F. (about 370° C.);

mixing the waste stream with the heating stream to form a mixed stream upstream from the reactor, the mixed stream comprising the oxidizable material from the waste stream and the heating stream, wherein the mixed stream is at a temperature of at least about 700° F. (about 370° C.) and a pressure of at least about 3200 psia (about 220 bar);

adding the mixed stream into the reactor, wherein the temperature of the mixed stream added to the reactor is at least about 700° F. (about 370° C.) and wherein the pressure of the mixed stream added to the reactor is at least about 3200 psia (about 220 bar); and reacting at least a portion of the oxidizable material of the mixed stream within the reactor.

50. The method of claim 1, wherein the oxidizer is added into the first stream prior to mixing the first stream and second stream.

51. The method of claim 1, wherein the oxidizer is added into the second stream prior to mixing the first stream and the second stream.

52. The method of claim 1, wherein the oxidizer is added to the first and second streams during mixing of the first stream and the second stream.

53. The method of claim 34, wherein adding oxidizer to a first stream and a second stream comprises adding the oxidizer to the second stream before mixing the second stream and the first stream.

54. The method of claim 34, further comprising adjusting a flow rate of the second stream into the reactor to maintain a substantially constant peak reactor temperature at a position within the reactor.

55. The method of claim 34, further comprising passing the mixed stream from the reactor through a heat exchanger, and wherein the passage of the mixed stream through the heat exchanger heats the second stream.

56. The method of claim 49, wherein the mixed stream that is added into the reactor further comprises a pH adjusting additive.

57. The method of claim 49, further comprising heating the heating stream to a temperature of between about 1000° F. (about 540° C.) to about 1200° F. (about 650° C.).

58. The method of claim 49, further comprising adding an oxidizer to the mixed stream before adding the mixed stream to the reactor, and wherein a concentration of the oxidizer in the mixed stream is sufficient to substantially oxidize the oxidizable material in the mixed stream.

* * * * *